United States Patent

Torborg

(10) Patent No.: US 10,495,737 B1
(45) Date of Patent: Dec. 3, 2019

(54) METHODS, SYSTEMS, AND COMPUTER READABLE MEDIA FOR TIME-SLOTTED ULTRA-WIDE-BAND OBJECT TRACKING

(71) Applicant: Clairvoyant Networks, LLC, Austin, TX (US)

(72) Inventor: Tadd Christian Torborg, Raleigh, NC (US)

(73) Assignee: Clairvoyant Networks, LLC, Austin, TX (US)

(*) Notice: Subject to any disclaimer, the term of this patent is extended or adjusted under 35 U.S.C. 154(b) by 0 days.

(21) Appl. No.: 16/270,560

(22) Filed: Feb. 7, 2019

(51) Int. Cl.
*H04W 64/00* (2009.01)
*H04W 24/10* (2009.01)
*G01S 5/02* (2010.01)

(52) U.S. Cl.
CPC .......... *G01S 7/4865* (2013.01); *G01S 5/0289* (2013.01); *H04W 24/10* (2013.01); *H04W 64/003* (2013.01)

(58) Field of Classification Search
CPC ........ H04W 4/02; H04W 4/023; H04W 4/80; H04W 56/001; H04W 4/025; H04W 4/06; H04L 67/12; H04L 43/04; H04L 65/4076; H04L 65/602; H04L 7/041; A63B 2225/54; A63B 24/0021; A63B 2220/14; A63B 2220/30; A63B 2220/62
See application file for complete search history.

(56) References Cited

U.S. PATENT DOCUMENTS

| 6,829,534 | B2 | 12/2004 | Fuchs et al. |
| 2003/0198212 | A1 | 10/2003 | Hoctor et al. |
| 2005/0130669 | A1 | 6/2005 | Mizugaki et al. |
| 2005/0237966 | A1 | 10/2005 | Aiello et al. |
| 2005/0237981 | A1 | 10/2005 | Aiello et al. |
| 2005/0271120 | A1 | 12/2005 | Hoctor |
| 2006/0291537 | A1 | 12/2006 | Fullerton et al. |
| 2007/0139191 | A1 | 6/2007 | Quatro |
| 2008/0075153 | A1 | 3/2008 | Roberts et al. |
| 2008/0103696 | A1 | 5/2008 | Cheok et al. |
| 2008/0170559 | A1 | 7/2008 | Zumsteg |
| 2009/0055123 | A1 | 2/2009 | Razzell |
| 2009/0231136 | A1 | 9/2009 | Sugla et al. |
| 2010/0266003 | A1 | 10/2010 | Patino-Studencka et al. |

(Continued)

OTHER PUBLICATIONS

Commonly-assigned, co-pending U.S. Appl. No. 16/383,301 for "Methods, Systems and Computer Readable Media for Providing and Using Ultra Wideband Local Area Networks (Lans)," (Unpublished, filed Apr. 12, 2019).

(Continued)

*Primary Examiner* — Kwasi Karikari (74) *Attorney, Agent, or Firm* — Jenkins, Wilson, Taylor, & Hunt P.A.

(57) ABSTRACT

Methods, systems, and computer readable media for time-slotted ultra-wide-band (UWB) object tracking are disclosed. A system includes anchors and tags having synchronized timing systems. The anchors are configured for performing time-slotted UWB ranging during time windows, one for each tag. During each window, the anchors sequentially transmit UWB transmissions in designated time slots, one for each anchor, as specified by an order of operation. The anchors receive responsive UWB transmissions from the tag assigned to the time window and determine time-of-flight measurements for the responsive UWB transmissions.

18 Claims, 8 Drawing Sheets

(56) References Cited

U.S. PATENT DOCUMENTS

| | | |
|---|---|---|
| 2010/0277286 A1 | 11/2010 | Burkart et al. |
| 2010/0322208 A1 | 12/2010 | Tsudaka |
| 2011/0051847 A1 | 3/2011 | Flury et al. |
| 2011/0092223 A1 | 4/2011 | Nakagawa et al. |
| 2011/0140970 A1 | 6/2011 | Fukagawa et al. |
| 2011/0274141 A1 | 11/2011 | Jantunen et al. |
| 2013/0051507 A1 | 2/2013 | Jantunen et al. |
| 2013/0154836 A1 | 6/2013 | Derrico et al. |
| 2014/0210660 A1 | 7/2014 | Larose et al. |
| 2014/0253388 A1 | 9/2014 | Jalali et al. |
| 2014/0304351 A1 | 10/2014 | Davis |
| 2014/0315582 A1 | 10/2014 | Dong et al. |
| 2015/0087331 A1 | 3/2015 | Yang et al. |
| 2015/0200706 A1 | 7/2015 | Bottazzi et al. |
| 2016/0044626 A1 | 2/2016 | Li et al. |
| 2016/0357193 A1* | 12/2016 | Bruemmer ............ G05D 1/101 |
| 2017/0026807 A1 | 1/2017 | Gherardi et al. |
| 2017/0131383 A1* | 5/2017 | Bartov .................. G01S 5/14 |
| 2017/0244444 A1 | 8/2017 | Bruemmer et al. |
| 2017/0261592 A1 | 9/2017 | Min et al. |
| 2017/0336493 A1 | 11/2017 | Gross |
| 2018/0045807 A1 | 2/2018 | Senna et al. |
| 2018/0059231 A1 | 3/2018 | Dewberry et al. |
| 2018/0067191 A1 | 3/2018 | Hamilton |
| 2018/0133580 A1 | 5/2018 | DeAngelis et al. |
| 2018/0213492 A1 | 7/2018 | Xia |
| 2018/0254925 A1 | 9/2018 | Dutz et al. |
| 2018/0272221 A1 | 9/2018 | Sundararajan et al. |
| 2019/0104493 A1 | 4/2019 | Hedley et al. |

OTHER PUBLICATIONS

Commonly-assigned, co-pending U.S. Appl. No. 16/294,674 for "Methods, Systems, and Computer Readable Media for Distribution of Time Synchronization Information to Ultra-Wide-Band Devices," (Unpublished, filed Mar. 6, 2019).

"Location Finds Bluetooth, Ultra-Wideband," Slashdot, https://mobile.slashdot.org/story/19/01/28/1630225/location-finds-bluetooth-ultra-wideband?utm_source=rss1.0mainlinkanon&utm_medium=feed, pp. 1-8 (Jan. 28, 2019).

Merritt, "Location Finds Bluetooth, UWB," EE Times, https://www.eetimes.com/document.asp?doc_id=1334243#, pp. 1-3 (Jan. 28, 2019).

"DW1000 Datasheet," Decawave IEEE802.15.4-2011 UWB Transceiver, Version 2.18, pp. 1-49 (2017).

"DW1000 User Manual," Decawave Ltd., Version 2.17, pp. 1-247 (2017).

"EVK1000 User Manual," Decawave Ltd., Version 1.13, pp. 1-30 (2016).

"TREK1000 User Manual," Decawave Ltd., Version 1.08, pp. 1-54 (2016).

"APS013 Application Note: The implementation of two-way ranging with the DW1000," Decawave, Version 2.3, pp. 1-15 (2015).

"APS016 Application Note: Moving from Trek1000 to a Product," Decaware, Version 2.3, pp. 1-24 (2015).

Gaffney, "Considerations and Challenges in Real Time Locating Systems Design," Decawave Ltd., White Papers, pp. 1-5 (Jun. 1, 2015).

McElroy et al., "Comparision of wireless clock synchronization algorithms for indoor location systems," International Conference on Communications, pp. 1-6 (Jun. 2014).

Yavari et al., "Ultra Wideband Wireless Positioning Systems," Technical Report TR14-230, pp. 1-51 (Mar. 27, 2014).

Non-Final Office Action for U.S. Appl. No. 16/294,674 (dated Jun. 14, 2019).

Notice of Allowance and Fee(s) Due for U.S. Appl. No. 16/383,301 (dated Aug. 2, 2019).

Notice of Allowance and Fee(s) Due for U.S. Appl. No. 16/294,674 (dated Sep. 27, 2019).

* cited by examiner

METHODS, SYSTEMS, AND COMPUTER READABLE MEDIA FOR TIME-SLOTTED ULTRA-WIDE-BAND OBJECT TRACKING

TECHNICAL FIELD

The subject matter described herein relates to ultra-wide-band communications. More particularly, the subject matter described herein relates to methods, systems, and computer readable media for time-slotted ultra-wide-band object tracking.

BACKGROUND

Many systems make use of signal strength to guess at how far away a calibrated (transmit signal level) sender is located. Being able to accurately measure the actual distance between devices would be valuable but, until recently, no practical scheme existed which could perform that function with useful precision in small areas.

RADAR (Radio Detection and Ranging) has been used since World War II to measure distance, counting the time between radio transmission of a pulse and reception of the echo (radio time-of-flight). RADAR uses a high-powered radio signal with enough energy that the signal reflected by a passive metal object at a distance still had enough energy to be received back at the RADAR transceiver. Because of the distances involved, thousands of feet to miles, the precision of the timers used in RADAR didn't have to be very good. The speed of a radio message is about 5.4 microseconds per mile. A RADAR set with a one megahertz counter would count about 5.4 ticks per mile. RADAR only worked in long distances and with very poor precision compared to the size of an indoor stage.

Some modern aircraft tracking systems use a scheme with an active transmitter called a transponder. The transponder notices the RADAR radio signal pulse and immediately transmits a complex radio message containing useful information about the aircraft. This supplemental information could even include the latitude and longitude of the aircraft, measured using global positioning system (GPS) equipment, giving redundant information back to the aircraft tracking network.

The challenge of tracking equipment inside a building isn't solved by RADAR or GPS. RADAR is too high energy and GPS is dependent on radio line-of-site with orbiting satellites. However, the transponder mechanism would be useful, if the time-delay between radio signal pulse and transponder response was knowable, and if the time-of-flight could be measured with much greater precision than 70-year-old RADAR technology.

In the ensuing 70 years, radio devices have become smaller and more sophisticated. We can now purchase integrated circuit (IC) radios which cost as little as $1 and which are far more sensitive than the old equipment, and which deliver digital data and receive signal strength. These radio IC chips have been used by tracking systems to provide location resolution with several meter precision. Time-of-flight measurement was still not practical until very recently.

Accordingly, in light of these difficulties associated with conventional solutions, there exists a need for methods, systems, and computer readable media for time-slotted ultra-wide-band object tracking.

SUMMARY

According to one aspect, a system for object tracking using ultra-wide-band (UWB) includes anchors and tags having synchronized timing systems. The anchors are configured for performing time-slotted UWB ranging during time windows, one for each tag. During each window, the anchors sequentially transmit UWB transmissions in designated time slots, one for each anchor, as specified by an order of operation. The anchors receive responsive UWB transmissions from the tag assigned to the time window and determine time-of-flight measurements for the responsive UWB transmissions.

In some examples, transmitting UWB transmissions includes, in each time slot, sending a first UWB message by the anchor specified for the time slot by the order of operations. Receiving responsive UWB transmissions includes, in each time slot, receiving a second message from the tag assigned to the time window. Determining a time-of-flight measurement includes determining the time-of-flight measurement based on a first timestamp for the first UWB message, a second timestamp for the second UWB message, and a reply time for the tag assigned to the time window.

In some examples, determining a location of the tag assigned to the time window includes determining, for each anchor, a distance to the anchor based on the time-of-flight measurement for the anchor and the speed of light. Determining the location includes solving a triangle for the tag assigned to the time window based on the distances to the anchors.

In some examples each tag includes a battery, and each anchor comprises an AC power source. Each tag can be configured to turn off the tag UWB radio of the tag outside of the time window assigned to the tag to preserve energy in the battery.

In some examples, the system includes a site master configured for time synchronizing the anchor timing systems and the tag timing systems. The site master can be configured for assigning tags to time windows and specifying the order of operations for the anchors to transmit based on the number of tags and the number of anchors within a UWB local area network (LAN).

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by a processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

This specification describes methods, systems, and computer readable media for time-slotted ultra-wide-band (UWB) object tracking. The methods, systems, and computer readable media can be used, for example, to establish the location of mobile assets inside a facility (e.g., one or more buildings) and relay that information to a remote computer system such as a cloud service.

The systems described in this specification can be used, for example, to generate a range from each of several fixed stations, called "anchors," to each of many mobile stations, called "tags." The location information can be delivered to, for example, an Internet-connected gateway device. In some examples, anchors are power-rich (e.g., alternating current (AC) powered from a wall socket) but do not have wired network connections. Tags may be power-rich but can be configured to accommodate battery power.

The deployment of anchors and tags in a facility could include large numbers of anchors and tags, e.g., hundreds of anchors and hundreds of tags. In some examples, each tag's proximity to several anchors is measured frequently, for example, between every two and every 60 seconds.

In some examples, only some parts of the facility will be populated with anchors, so tag location might not be available from all locations within the facility. However, the system can be configured to report that a tag was recently detected in the facility. The rate of that reporting, and the rate of tag precision locating can be adjustable with consideration of factors such as battery life and tag density.

Figure 1:
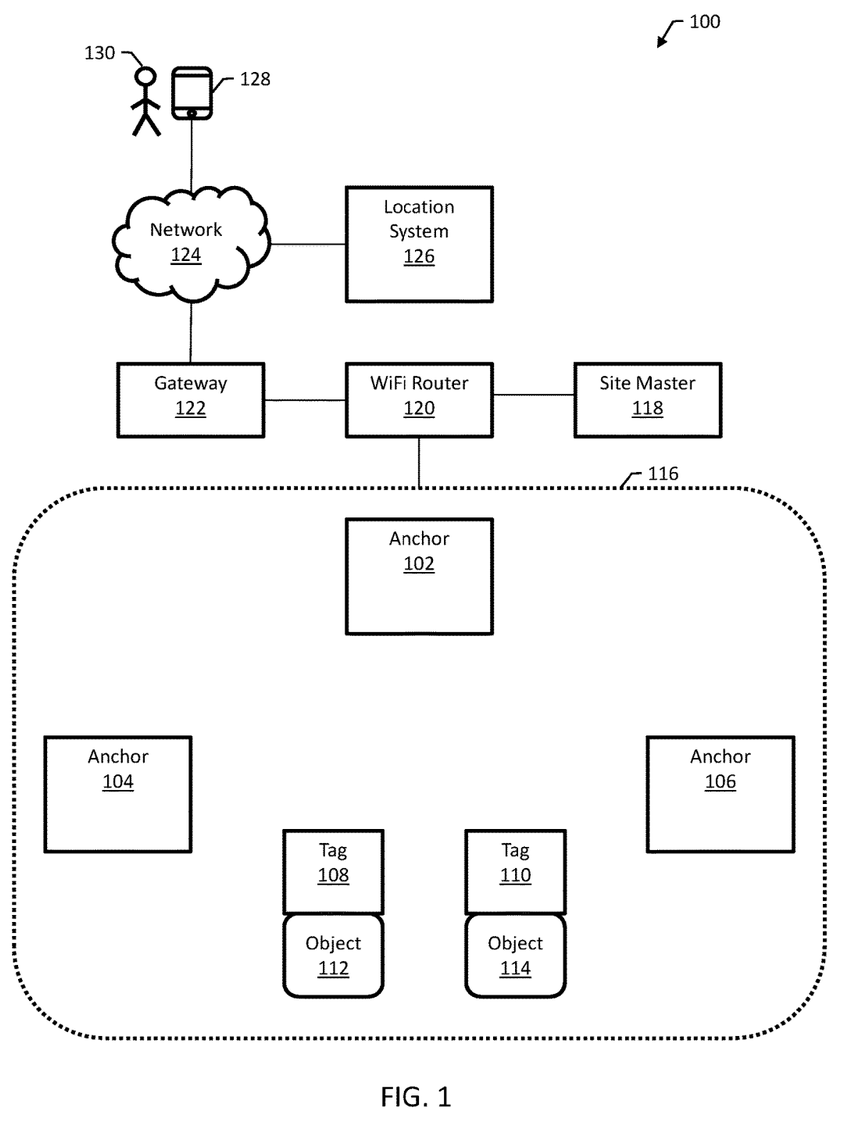
FIG. 1 is a block diagram of an example system for UWB object tracking.

FIG. 1 is a block diagram of an example system 100 for UWB object tracking. System 100 includes at least three anchors 102, 104, and 106. Each of anchors 102, 104, and 106 can include at least one processor, a UWB radio, and a timing system.

System 100 includes several tags each secured to an object for tracking. For purposes of illustration, FIG. 1 shows two tags 108 and 110 secured to two objects 112 and 114. Each of tags 108 and 110 can include at least one processor, a UWB radio, and a timing system. The tag timing systems are synchronized to the anchor timing systems. Taken together, anchors 102, 104, and 106 and tags 108 and 110 form an UWB local area network (LAN) 116.

In operation, anchors 102, 104, and 106 and tags 108 and 110 perform time-slotted UWB ranging. For example, anchors 102, 104, and 106 can perform time-slotted UWB ranging during designated time windows, one for each tag. In each time window, anchors 102, 104, and 106 sequentially transmit UWB transmissions in designated time slots of the time window, one time slot for each anchor, as specified by an order of operation. The tag assigned to the time window receives the UWB transmissions and responds to each transmission by sending a responsive UWB transmission. Anchors 102, 104, and 106 receive the responsive UWB transmissions and determine time-of-flight measurements for the responsive UWB transmissions. Then, each anchor of anchors 102, 104, and 106 determines a distance between the anchor and the tag assigned to the time window based on the time-of-flight measurements.

System 100 can include a site master 118. Site master 118 is a computer system configured for synchronizing the tag timing systems and the anchor timing systems. Site master 118 can communicate with the LAN 116, e.g., by way of a WiFi router 120.

System 100 can include a gateway 122. The gateway 122 is a computer system configured for communicating with a data communications network 124, such as the Internet, to communicate with a location system 126. Location system 126 is a computer system configured for receiving ranging information from anchors 102, 104, and 106 and determining tag locations. Location system 126 can also be configured for assigning tags to time windows, designating time slots within the time windows, and for specifying an order of operation for anchors to transmit in the time slots within the time windows.

System 100 can include a user device 128, e.g., a user computer or mobile phone or tablet. A user 130 can use the user device 128 to determine the location of the objects 112 and 114. For example, anchors 102, 104, and 106 can transmit ranging information for tags 108 and 110 to location system 126 by way of gateway 122, and location system 126 can receive and respond to location requests from user device 128.

In some examples, location system 126 maintains data associating tag identifiers with object identifiers and assigned time windows. For example, when user 130 secures tag 108 to object 112, a tag identifier for tag 108 can be associated with an object identifier for object 112 in a database stored at location system 126. Location system 126 can then associate the assigned time window for tag 108 with the tag identifier and the object identifier. When user 130 requests the location of object 112, user 130 can supply the object identifier in a request message. Location system 126 can look up the tag identifier and the assigned time window for the tag identifier. Location system 126 can then respond with the tag location based on the ranging message exchange during the assigned time window for the tag identifier.

In general, anchors 102, 104, and 106 report ranging distances to location system 126 (or another appropriate computer system), for example, by transmitting ranging distances to gateway 122 by way of Wi-Fi router 120, and location system 126 determines tag locations based on the reported ranging distances from the anchors.

In some examples, the tags can be used to track mobile phones. For example, some mobile phones may have embedded UWB radios that can be used as the tags shown in FIG. 1. Suppose that object 112 is a mobile phone and that tag 108 is implemented on the processor of the mobile phone and an embedded UWB radio of the mobile phone. Then, the mobile phone can, for example, register with site master 118 and the location of the mobile phone can be tracked using tag 108.

Figure 2A:
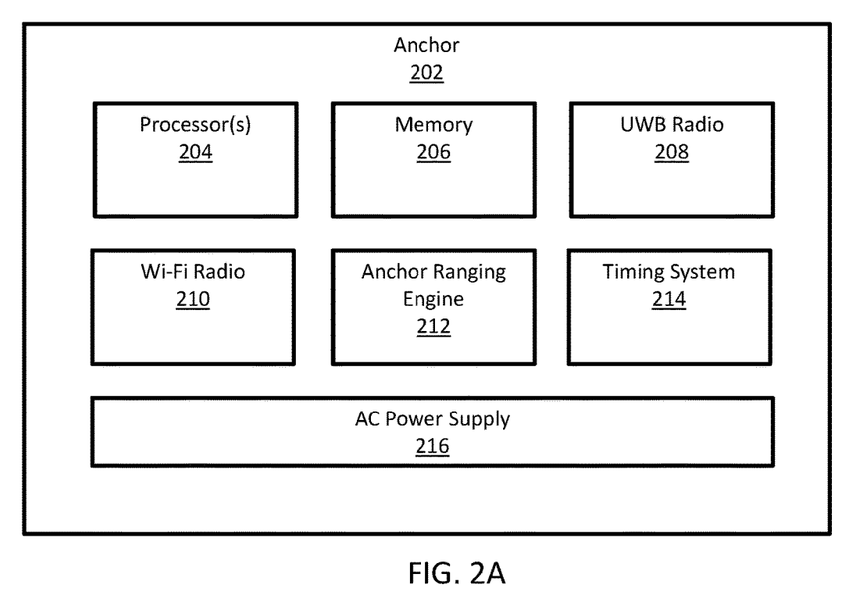
FIG. 2A is a block diagram of an example anchor.

FIG. 2A is a block diagram of an example anchor 202. Anchor 202 includes at least one processor 204 and memory 206 storing executable instructions for the processor 204. Anchor 202 includes a UWB radio 208 and an optional Wi-Fi radio 210. Anchor 202 includes an anchor ranging engine 212 implemented on the processor 204 and a timing system 214. Anchor 202 is powered by an AC power supply 216. Anchor 202 can be implemented using an integrated circuit from DECAWAVE.

Anchor ranging engine 212 is configured for performing time-slotted UWB ranging during time windows. Anchor ranging engine 212 receives timing information from timing system 214. During a time window for performing ranging with a particular tag, anchor ranging engine 212 waits until a designed time slot and then begins a ranging message sequence.

For example, the message sequence can include sending a first UWB message to the tag and recording a first time stamp for the transmission time of the first UWB message. Then, the message sequence can include receiving a second message, responsive to the first message, from the tag and recording a second time stamp for the reception time of the second UWB message. Anchor ranging engine 212 can then determine a time-of-flight measurement for the message sequence.

Determining a time-of-flight measurement can include determining a difference between the two time stamps, subtracting a reply time for the tag from the difference between the two time stamps, and dividing by two. The reply time for the tag can be pre-programmed into anchor ranging engine 212 or transmitted by the tag, e.g., in the second UWB message. Anchor ranging engine 212 can then determine the distance to the tag by multiplying by the speed of light, assuming that the speed of radio waves though air is the same as the speed of light.

In general, anchor ranging engine 212 can use any appropriate ranging message sequence. For example, where sources of error can include clock drift and frequency drift, an asymmetric double-sided two-way ranging sequence can be used. The messages can include a poll message, a response message, and a final message.

Anchor ranging engine 212 can be configured to transmit ranging information, including the distance between anchor 202 and a tag, to a remote system configured to determine a location of the tag based on the ranging information. For example, determining a location of the tag can include solving a triangle for the tag based on the distances to the anchors and pre-determined location information for the anchors.

Timing system 214 can be implemented as a counter/clock that counts at a speed sufficient to make a time-of-flight measurement possible. In some examples, timing system 214 counts at 15.65 picoseconds per tick or faster, which can yield the ability to report fractions of a centimeter.

Figure 2B:
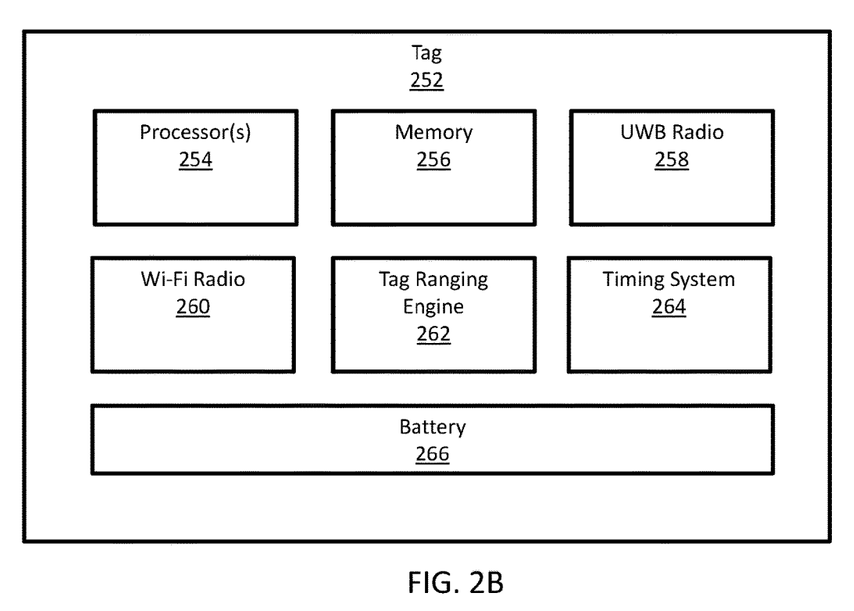
FIG. 2B is a block diagram of an example tag.

FIG. 2B is a block diagram of an example tag 252. Tag 252 includes at least one processor 254 and memory 256 storing executable instructions for the processor 254. Tag 252 includes a UWB radio 258 and an optional Wi-Fi radio 260. Tag 252 includes a tag ranging engine 262 implemented on the processor 204 and a timing system 264. Tag 252 is powered by a battery 266. Tag 252 can be implemented using an integrated circuit from DECAWAVE.

Tag ranging engine 252 is configured for performing time-slotted UWB ranging during time windows. Tag ranging engine 252 receives timing information from timing system 264. During an assigned time window for performing ranging, tag ranging engine 262 responds to ranging messages initiated by anchors. In response to receiving a ranging message, tag ranging engine 262 sends a responsive message. In some examples, tag ranging engine is configured to turn off UWB radio 258 outside of the assigned time window, which can be useful to preserve energy in battery 266.

In some examples, tag ranging engine 262 includes a reply time for tag 252 in the responsive message. The reply time is the time between receiving the ranging message from the anchor and transmitting the responsive message.

Figure 3:
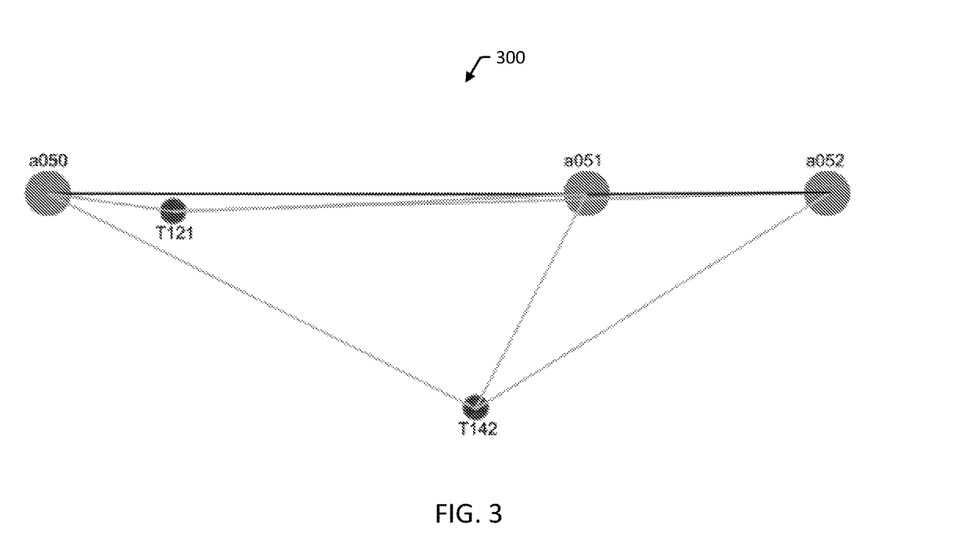
FIG. 3 is a location diagram illustrating an example of tag location determination.

FIG. 3 is a location diagram 300 illustrating an example of tag location determination. Location diagram 300 shows the location of three anchors labelled a050, a051, and a052. Location diagram 300 also shows the location of two tags labelled T121 and T142.

Solving for the location of a tag includes taking known baselines between fixed anchors, and then calculating the range between the anchors and the tag. The measured distances plus the known anchor-to-anchor distance result in a triangle of known sides. Using trigonometry, the system calculates the angles between two anchors and the tag. This results in two possible positions for the tag. A different combination of two anchors is then considered and that generates a different pair of two locations. The calculations result in the one location in common between the two sets of data.

The fixed anchors must be of sufficiently different bearing (angle relative to some base-line) to the tag that the math to calculate the location from the ranges results in little loss of precision. It would not do, for instance, for all three anchors to be in the same direction from the tag.

The distance between an anchor and a tag where ranging is possible may be, e.g., under 40 feet in an office building or medical facility. In some cases, one wall thickness will block the signal.

Determining the 2D location of an object can be accomplished using:
  a bearing and distance from a known location; or
  a bearing from each of two known locations; or
  a distance from each of three known locations.

The anchors and tags may be configured to measure distance only, not angle, or location. Thus for 2D location calculations will use distance information from at least three known locations (anchors). For 3D location calculations, distance information from at least four anchors is used.

Using distance values, we can visualize a triangle using three known sides. One of the three sides is the distance between two anchors. Two more sides are provided by the ranging information between the two anchors and the tag. Using trigonometry, e.g., the law of sins and the law of co-sins, we can now calculate two triangles which would place the tag in one of the vertices of each triangle. The other two vertices are the anchors. Since there can be two mirrored solutions, a third anchor is used with one of the first two anchors to generate two more triangles. The common vertex between two of the four triangles will yield the true location of the tag.

When doing location calculations, it is ideal if the anchors are surrounding the tag. If all the anchors are in the same direction from the tag the error factor in the trigonometry calculations will make the location accuracy unreasonable. While it is possible to track tags when the anchors are all lined up, it will not be possible to track tags which are near the line of anchors.

Referring to FIG. 3, the a051-T121-a052 angles are 1.2 and 2.5 degrees. The a050-T121-a051 angles are 8 and 2.5 degrees. The math to calculate those angles from the reported ranges will have a large error and the tag can't be located under these conditions.

The a050-T142-a051 angles are 27 and 62.5 degrees. The a051-T142-1052 angles are 62.5 and 31 degrees. This will deliver a more accurate location. If additional anchors are available, a location determination algorithm can iterate through available locations until finding a maximum balance between angles closest to 45 degrees and the ranges between 1 meter and 10 meters. For example, a weighting calculation can grade the available location calculations.

Figure 4A:
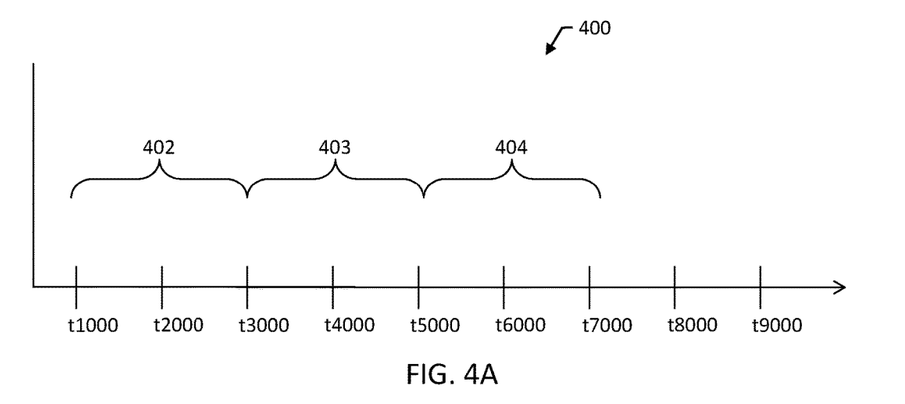
FIG. 4A is a timeline illustrating example repeating epochs of the system.

FIG. 4A is a timeline 400 illustrating example repeating epochs of the system 100 of FIG. 1. FIG. 4A shows three epochs 402, 403, and 404. Each epoch is a time interval in which all system behaviors take place once. In each epoch, anchors 102, 104, and 106 complete ranging for tags 108 and 110. Other message exchanges, e.g., for time synchronization, can also occur during each epoch.

An epoch has a suitable duration for all of the system behaviors to take place once, e.g., two seconds. For example, an epoch can include six time windows, and up to six tags can be assigned to the six time windows. A time window can include enough time for, e.g., 300 ranging exchanges.

Figure 4B:
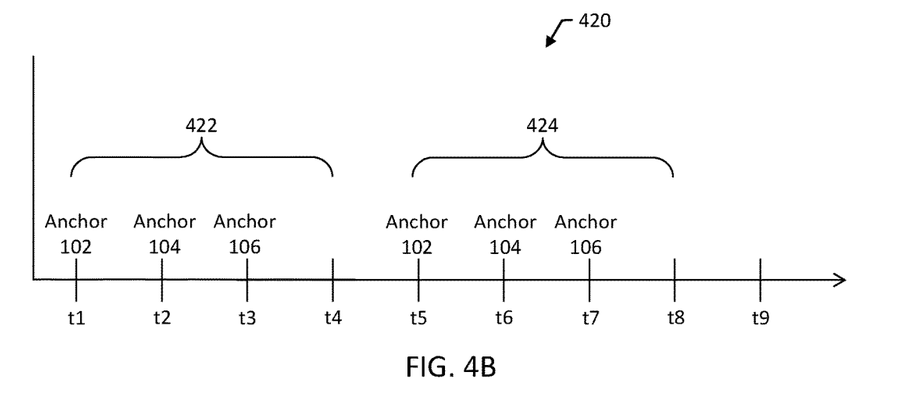
FIG. 4B is a timeline illustrating example time windows for performing time-slotted UWB ranging.

FIG. 4B is a timeline 420 illustrating example time windows for performing time-slotted UWB ranging on the tags 108 and 110 of FIG. 1. FIG. 4B shows a first time window 422 for tag 108 and a second time window 424 for tag 110.

In time window 422, a time slot between time t1 and time t2 is designated for anchor 102 to perform ranging on tag 108. A time slot between time t2 and time t3 is designated for anchor 104 to perform ranging on tag 108. A time slot between time t3 and time t4 is designated for anchor 106 to perform ranging on tag 108.

In time window 424, a time slot between time t5 and time t6 is designated for anchor 102 to perform ranging on tag 110. A time slot between time t6 and time t7 is designated for anchor 104 to perform ranging on tag 110. A time slot between time t7 and time t8 is designated for anchor 106 to perform ranging on tag 110. Although a gap is illustrated between time window 424 and time window 422, in some examples, time windows may be adjacent.

Figure 4C:
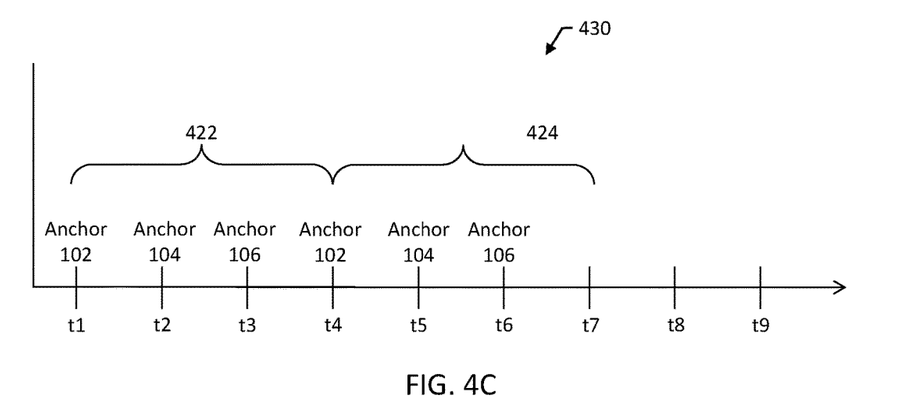
FIG. 4C is a timeline illustrating example time windows for performing time-slotted UWB ranging.

FIG. 4C is a timeline 430 illustrating example time windows for performing time-slotted UWB ranging on the tags 108 and 110 of FIG. 1. FIG. 4C shows the first time window 422 and the second time window 424 from FIG. 4B. First time window 422 and second time window 424 are immediately adjacent, i.e., anchor 102 begins performing ranging on tag 110 in the next time slot (from t4 to t5) after anchor 106 completes ranging on tag 108 (after the time slot from t3 to t4). The time windows can be immediately adjacent as illustrated in FIG. 4C by virtue of time-synchronized timing systems in the anchors and tags.

Figure 5:
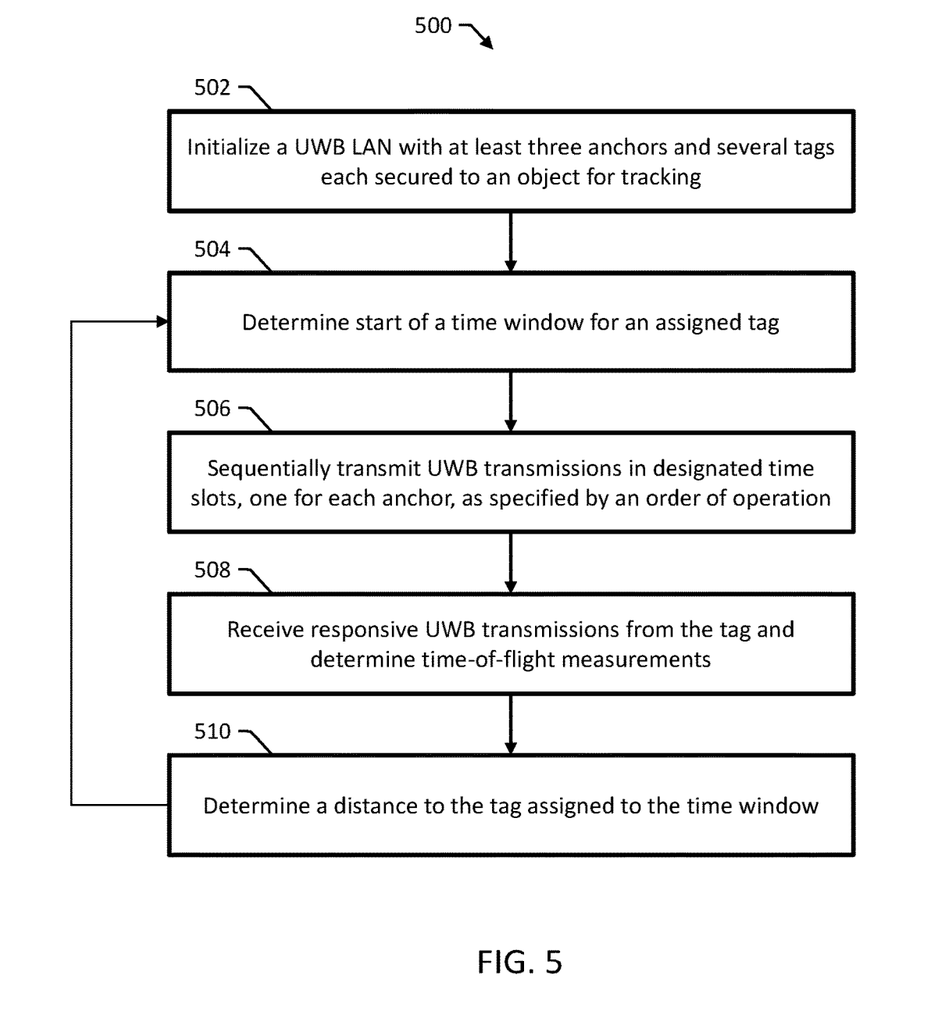
FIG. 5 is a flow diagram of an example method for UWB object tracking.

FIG. 5 is a flow diagram of an example method 500 for UWB object tracking. Method 500 can be performed by the system 100 of FIG. 1.

Method 500 includes initializing a UWB LAN with at least three anchors and several tags each secured to an object for tracking (502). Initializing the LAN can include assigning the tags to time windows and specifying an order of operations for the anchors to transmit, e.g., based on the number of tags and the number of anchors within the LAN. Initializing the LAN can include determining locations of the anchors, e.g., by receiving operator input specifying the locations of the anchors or performing ranging between anchors or both.

Method 500 includes determining the start of a time window for an assigned tag (504). Method 500 includes sequentially transmitting UWB transmissions in designated time slots, one for each anchor, as specified by an order of operations for the anchors (506). Method 500 includes receiving responsive UWB transmissions from the tag and determining time-of-flight measurements for the responsive UWB transmissions (508). Method 500 includes determining, at each anchor, a distance between the anchor and the tag assigned to the time window based on the time-of-flight measurements (510). Each anchor can then transmit the distances to a location system configured to determine locations of the tags. Method 500 repeats by returning to determine the start of a time window for another assigned tag (return to 504).

Figure 6A:
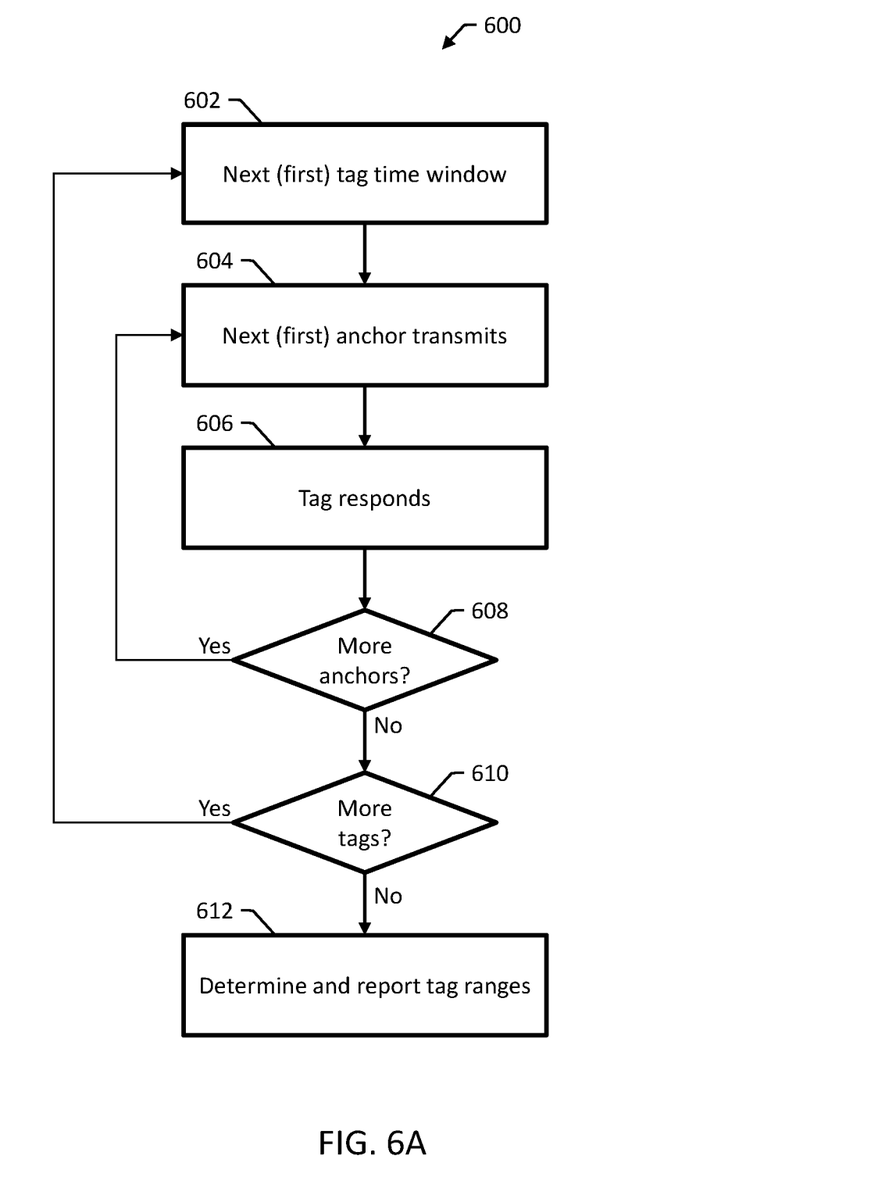
FIGS. 6A-6C are flow diagrams of three different example methods for completing ranging between anchors and tags.
Figure 6B:
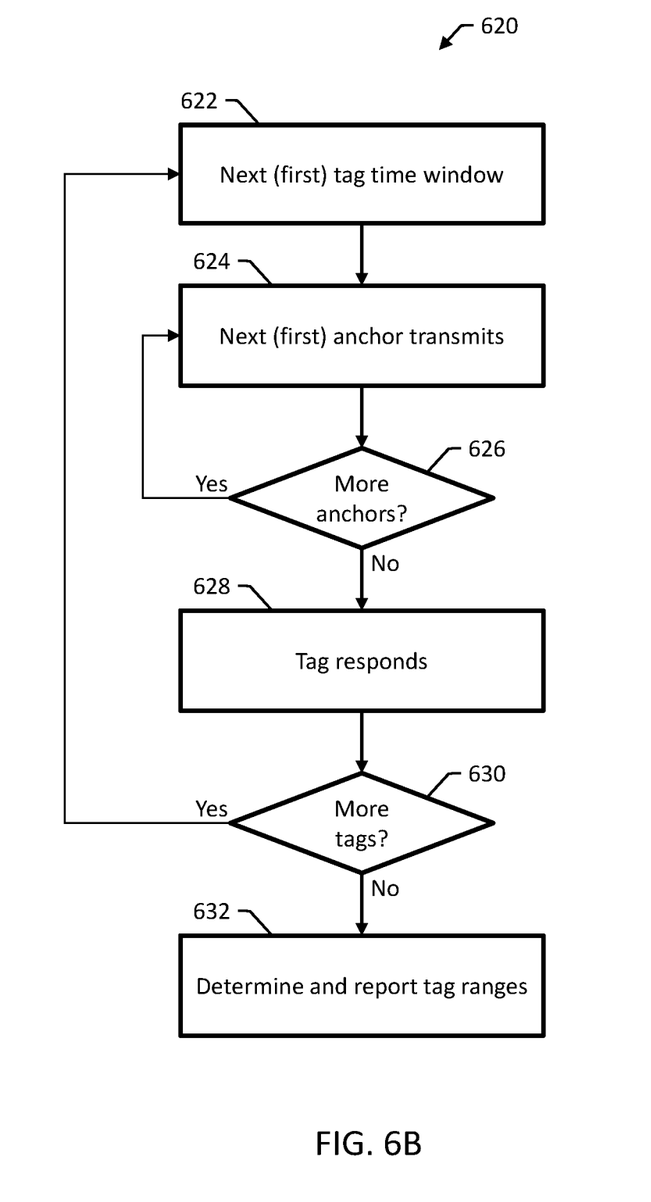
Figure 6C:
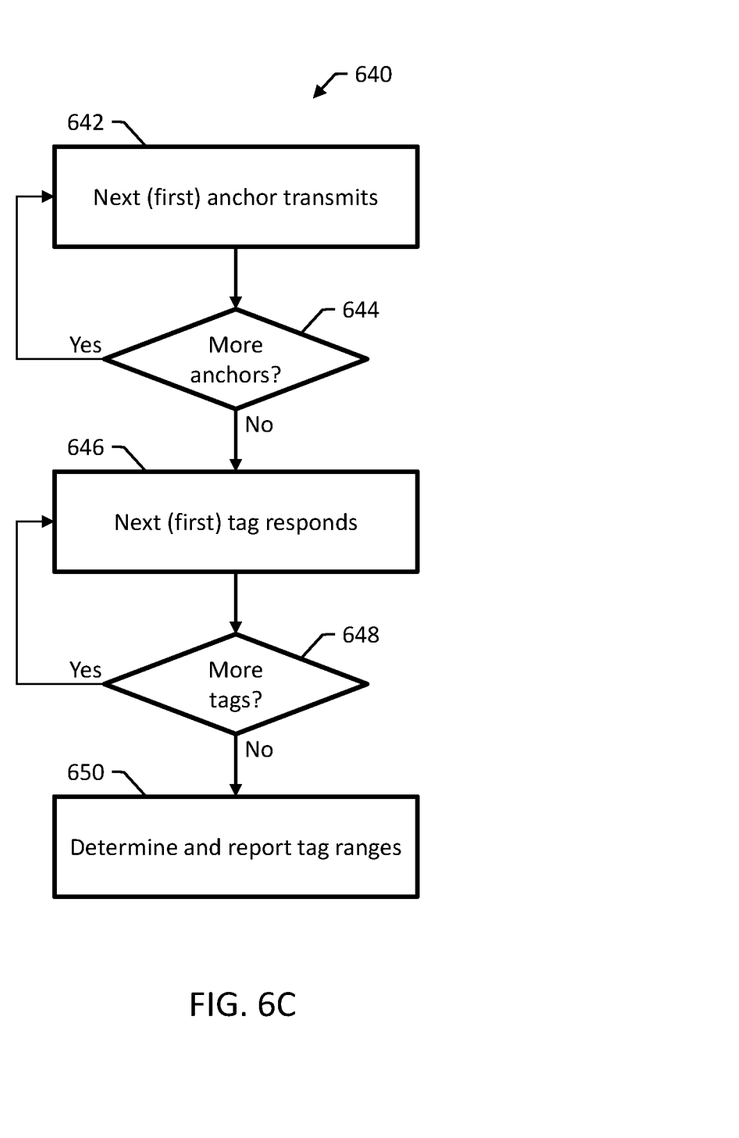

FIGS. 6A-6C are flow diagrams of three different example methods for completing ranging between anchors and tags. Each flow diagram illustrates a method as performed through one full check of a number of tags, e.g., as performed during one epoch of the system 100 of FIG. 1.

FIG. 6A is a flow diagram of a first example method 600. Method 600 includes determining the start of a next (or first) tag time window (602). Method 600 includes transmitting at a next (or first) anchor (604). Method 600 includes transmitting a response by the tag assigned to the tag time window (606). Method 600 includes, if there are more anchors (608), sequentially transmitting by each of the anchors until the anchors have all transmitted (return to 604). Method 600 includes, if there are more tags (610), repeating the sequential transmission by the anchors until all the tags have been completed (return to 602). Method 600 includes determining and reporting the tag ranges (612).

For example, consider a scenario including four anchors and three tags. The sequence of transmissions would be as follows:

Anchor 01 initiates
Tag 01 answers
Anchor 02 initiates
Tag 01 answers
Anchor 03 initiates
Tag 01 answers
Anchor 04 initiates
Tag 01 answers
Anchor 01 initiates
Tag 02 answers
Anchor 02 initiates
Tag 02 answers
Anchor 03 initiates
Tag 02 answers
Anchor 04 initiates
Tag 02 answers
Anchor 01 initiates
Tag 03 answers
Anchor 02 initiates
Tag 03 answers
Anchor 03 initiates
Tag 03 answers
Anchor 04 initiates
Tag 03 answers FIG. 6B is a flow diagram of a second example method 620. Method 620 includes determining the start of a next (or first) tag time window (622). Method 620 includes transmitting at a next (or first) anchor (624). Method 620 includes, if there are more anchors (626), sequentially transmitting by each of the anchors until the anchors have all transmitted (return to 624). Method 620 includes transmitting a response by the tag assigned to the tag time window (628). Method 620 includes, if there are more tags (630), repeating the sequential transmission by the anchors until all the tags have been completed (return to 622). Method 620 includes determining and reporting the tag ranges (632).

For example, consider a scenario including four anchors and three tags. The sequence of transmissions would be as follows:

Anchor 01 initiates
Anchor 02 initiates

Anchor 03 initiates
Anchor 04 initiates
Tag 01 answers
Anchor 01 initiates
Anchor 02 initiates
Anchor 03 initiates
Anchor 04 initiates
Tag 02 answers
Anchor 01 initiates
Anchor 02 initiates
Anchor 03 initiates
Anchor 04 initiates
Tag 03 answers FIG. 6C is a flow diagram of a third example method 640. Method 640 includes transmitting at a next (or first) anchor (642). Method 640 includes, if there are more anchors (644), sequentially transmitting by each of the anchors until the anchors have all transmitted (return to 642). Method 640 includes transmitting a response by a next (or first) tag (646). Method 640 includes, if there are more tags (648), repeating the sequential transmission by the anchors until all the tags have been completed (return to 646). Method 640 includes determining and reporting the tag ranges (650).

For example, consider a scenario including four anchors and three tags. The sequence of transmissions would be as follows:

Anchor 01 initiates
Anchor 02 initiates
Anchor 03 initiates
Anchor 04 initiates
Tag 01 answers
Tag 02 answers
Tag 03 answers Although specific examples and features have been described above, these examples and features are not intended to limit the scope of the present disclosure, even where only a single example is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system for object tracking using Ultra-Wide-Band (UWB), the system comprising:
    a plurality of anchors, wherein each anchor comprises at least one anchor processor, an anchor UWB radio, and an anchor timing system;
    a plurality of tags each securable to an object for tracking, wherein each tag comprises at least one tag processor, a tag UWB radio, and a tag timing system, wherein the tag timing systems are synchronized to the anchor timing systems; and
    wherein the anchors are configured for performing time-slotted UWB ranging during a plurality of time windows, with one tag assigned to each time window,
    wherein performing time-slotted UWB ranging comprises, for each time window and the tag assigned to the time window:
        sequentially transmitting UWB transmissions in designated time slots, one for each anchor, as specified by an order of operation, wherein transmitting UWB transmissions comprises, in each time slot, sending a first UWB message by the anchor specified for the time slot by the order of operations; and
        receiving responsive UWB transmissions from the tag assigned to the time window and determining time-of-flight measurements for the responsive UWB transmissions.

2. The system of claim 1, wherein performing time-slotted UWB ranging comprises, for each time window and the tag assigned to the time window:
    determining, at each anchor, a distance between the anchor and the tag assigned to the time window based on the time-of-flight measurements.

3. The system of claim 1, wherein receiving responsive UWB transmissions comprises, in each time slot, receiving a second message from the tag assigned to the time window.

4. The system of claim 3, wherein determining a time-of-flight measurement comprises determining the time-of-flight measurement based on a first timestamp for the first UWB message, a second timestamp for the second UWB message, and a reply time for the tag assigned to the time window.

5. The system of claim 1, wherein determining the distance between the anchor and the tag assigned to the time window comprises determining the distance based on the time-of-flight measurement for the anchor and the speed of light.

6. The system of claim 1, wherein each tag comprises a battery, and wherein each anchor comprises an AC power source.

7. The system of claim 6, wherein each tag is configured to turn off the tag UWB radio of the tag outside of the time window assigned to the tag to preserve energy in the battery.

8. The system of claim 1, comprising a site master configured for time synchronizing the anchor timing systems and the tag timing systems.

9. The system of claim 1, wherein performing time-slotted UWB ranging comprises transmitting, at each anchor, ranging information for the tags to a location system configured for determining locations of the tags based on the ranging information.

10. A method for object tracking using Ultra-Wide-Band (UWB), the method comprising:
    initializing a UWB local area network (LAN) comprising a plurality of anchors and a plurality of tags each secured to an object for tracking, wherein each anchor comprises: at least one anchor processor, an anchor UWB radio, and an anchor timing system, and wherein each tag comprises: at least one tag processor, a tag UWB radio, and a tag timing system, wherein the tag timing systems are synchronized to the anchor timing systems; and
    performing time-slotted UWB ranging during a plurality of time windows, with one tag assigned to each time window;

wherein performing time-slotted UWB ranging comprises, for each time window and the tag assigned to the time window:
sequentially transmitting UWB transmissions in designated time slots, one for each anchor, as specified by an order of operation, wherein transmitting UWB transmissions comprises, in each time slot, sending a first UWB message by the anchor specified for the time slot by the order of operations; and
receiving responsive UWB transmissions from the tag assigned to the time window and determining time-of-flight measurements for the responsive UWB transmissions.

11. The method of claim 10, wherein performing time-slotted UWB ranging comprises, for each time window and the tag assigned to the time window:
determining, at each anchor, a distance between the anchor and the tag assigned to the time window based on the time-of-flight measurements.

12. The method of claim 10, wherein receiving responsive UWB transmissions comprises, in each time slot, receiving a second message from the tag assigned to the time window.

13. The method of claim 12, wherein determining a time-of-flight measurement comprises determining the time-of-flight measurement based on a first timestamp for the first UWB message, a second timestamp for the second UWB message, and a reply time for the tag assigned to the time window.

14. The method of claim 10, wherein determining of the distance between the anchor and the tag assigned to the time window comprises determining the distance based on the time-of-flight measurement for the anchor and the speed of light.

15. The method of claim 10, wherein each tag comprises a battery, and wherein each anchor comprises an AC power source.

16. The method of claim 15, wherein each tag is configured to turn off the tag UWB radio of the tag outside of the time window assigned to the tag to preserve energy in the battery.

17. The method of claim 10, comprising a site master configured for time synchronizing the anchor timing systems and the tag timing systems.

18. The method of claim 10, wherein performing time-slotted UWB ranging comprises transmitting, at each anchor, ranging information for the tags to a location system configured for determining locations of the tags based on the ranging information.

* * * * *